(12) United States Patent
McKeown et al.

(10) Patent No.: US 7,861,347 B2
(45) Date of Patent: Jan. 4, 2011

(54) DEVICE FOR CLEANING SNOW AND DEBRIS FROM AROUND ELEVATED OBSTACLES

(75) Inventors: Stephen Lyle McKeown, Campbellford (CA); Daniel Andrew Faux, Trenton (CA)

(73) Assignee: 3rd Millennium Solutions Ltd., Campbellford (CA)

( * ) Notice: Subject to any disclaimer, the term of this patent is extended or adjusted under 35 U.S.C. 154(b) by 808 days.

(21) Appl. No.: 11/756,838

(22) Filed: Jun. 1, 2007

(65) Prior Publication Data

US 2007/0277334 A1 Dec. 6, 2007

Related U.S. Application Data

(60) Provisional application No. 60/809,894, filed on Jun. 2, 2006.

(51) Int. Cl.
*E01H 1/05* (2006.01)
(52) U.S. Cl. ............................ 15/4; 15/21.1; 15/52.1; 15/79.2; 15/82; 15/88.4; 37/232; 37/241
(58) Field of Classification Search ............... 15/4, 15/21.1, 49.1, 52.1, 53.1, 53.2, 79.2, 82, 15/88.4; 37/219, 232, 241, 242
See application file for complete search history.

(56) References Cited

U.S. PATENT DOCUMENTS

| | | | | |
|---|---|---|---|---|
| 538,781 A | * | 5/1895 | Hollingsworth | 15/82 |
| 644,739 A | * | 3/1900 | Greeley et al. | 15/82 |
| 1,741,360 A | * | 12/1929 | Dagel | 37/238 |
| 2,175,542 A | | 10/1939 | Robarge | |
| 2,636,198 A | * | 4/1953 | Wilson | 15/53.2 |
| 3,034,236 A | * | 5/1962 | Pyke | 37/211 |
| 3,099,852 A | * | 8/1963 | Grant | 15/50.3 |

(Continued)

FOREIGN PATENT DOCUMENTS

DE 8909243 9/1989

(Continued)

OTHER PUBLICATIONS

Reflector Post Washer, RPS-H, Schmidt Holding GmbH, 2007, from webpage: http://www.schmidt-automotive.com/holding/english/products/summer/cleaning/municipal/rps-h.php, 2 pages.

*Primary Examiner*—Mark Spisich
(74) *Attorney, Agent, or Firm*—Pearne & Gordon LLP

(57) ABSTRACT

A vehicle for removing an accumulation of particles comprises a vehicle body, a system configured to remove the particles in bulk, and an arm coupled to and extending from the vehicle body. The arm comprises a first sweeping element and a second sweeping element. Each sweeping element includes a shaft member rotatable about a longitudinal axis, and a set of bristles projecting away from the axis along the shaft member. The first and second longitudinal axes are a distance apart, and the sweeping elements define a concerted sweeping area. The arm may be movably coupled to the vehicle body and may be configured to move the sweeping element around the vehicle body by rotating the arm about a horizontal axis. When a sweeping element rotates in proximity to the ground, the longitudinal axis is substantially vertical. The vehicle may further include a computer system for tracking the location of an object.

18 Claims, 13 Drawing Sheets

U.S. PATENT DOCUMENTS

| | | | |
|---|---|---|---|
| 3,104,406 A * | 9/1963 | Rhodes | 15/53.1 |
| 3,230,645 A * | 1/1966 | Lutz | 37/242 |
| 3,439,372 A * | 4/1969 | Collier | 15/53.1 |
| 3,457,574 A * | 7/1969 | Hirt | 15/88.4 |
| 3,460,177 A * | 8/1969 | Rhinehart et al. | 15/53.1 |
| 3,539,014 A | 11/1970 | Jonsson | |
| 3,748,675 A | 7/1973 | Schultz | |
| 3,748,680 A * | 7/1973 | Griffin | 15/50.3 |
| 3,778,857 A * | 12/1973 | Hughes | 15/4 |
| 3,790,981 A | 2/1974 | Young | |
| 3,835,498 A * | 9/1974 | Arato | 15/53.2 |
| 3,922,745 A | 12/1975 | Lehman | |
| 4,084,285 A | 4/1978 | Herzog | |
| 4,125,915 A | 11/1978 | Zamboni | |
| 4,290,820 A | 9/1981 | Swisher, Jr. et al. | |
| 4,327,666 A * | 5/1982 | Lee | 118/679 |
| 4,414,699 A | 11/1983 | Hirt | |
| 4,490,874 A | 1/1985 | Duncan | |
| 4,724,565 A * | 2/1988 | Higaki et al. | 15/53.2 |
| 4,835,811 A * | 6/1989 | Crowhurst | 15/88.4 |
| 5,092,012 A * | 3/1992 | Rabourn et al. | 15/97.3 |
| 5,115,531 A * | 5/1992 | Suzuki | 15/53.2 |
| 5,282,290 A * | 2/1994 | VanFossen | 15/49.1 |
| 5,720,069 A * | 2/1998 | Wanner et al. | 15/53.1 |
| 5,769,954 A * | 6/1998 | Wanner et al. | 134/6 |
| 5,794,298 A * | 8/1998 | Fugel et al. | 15/53.2 |
| 5,979,001 A * | 11/1999 | Marrero | 15/53.1 |
| 6,134,734 A * | 10/2000 | Marrero | 15/53.1 |
| 2002/0121561 A1* | 9/2002 | Marrero | 239/159 |
| 2005/0102778 A1* | 5/2005 | Gregerson | 15/82 |
| 2005/0268940 A1* | 12/2005 | Vohra | 134/6 |

FOREIGN PATENT DOCUMENTS

| | | |
|---|---|---|
| DE | 3928914 | 3/1991 |
| DE | 19745887 | 8/1998 |
| DE | 29901738 | 5/1999 |

* cited by examiner

DEVICE FOR CLEANING SNOW AND DEBRIS FROM AROUND ELEVATED OBSTACLES

CROSS-REFERENCE TO RELATED APPLICATIONS

This application claims the benefit of U.S. Provisional Application No. 60/809,894, filed Jun. 2, 2006, the entire disclosure of which is hereby incorporated herein by reference.

BACKGROUND OF THE INVENTION

The present invention relates to machines for removing snow or other particles, and more particularly, to machines for removing snow or other particles from elevated objects such as signs or edge lights on an airfield.

Various types of indicators such as signs and lights are used to direct pilots both into and around an airfield, for example, by marking the edges of a runway. These indicators can be flush with the ground or recessed or can be elevated both to allow the pilots to see them from a distance and to keep them visible when particles such as snow fall around them. As to the indicators that are flush with the ground or recessed, accumulation such as snowfall can hide them from view. Even when these objects are elevated, snow and ice tend to build up around them, especially in climates with heavy snowfall accumulation, or the snow can pushed onto them from an adjacent runway surface. Such buildup of particles must be removed to keep the lights and signs visible at all times.

The lights and signs are very delicate and it is difficult to remove accumulations of particles around them without damaging them. Conventional snow blowers, plows or sweepers cannot remove the snow from these lights and signs. Many airports currently send crews of workers to remove the buildup. These crews manually remove the buildup with hand shovels and brooms. Such a task is a very labor-intensive and time-consuming process requiring the closure of adjacent surfaces for safety.

Therefore, there is a need for a more convenient and efficient way of removing accumulations of particles from indicators on an airfield.

SUMMARY OF THE INVENTION

Accordingly, it is an aspect of the present invention to obviate problems and shortcomings of conventional snow blowers, plows or sweepers.

In accordance with one aspect of the present invention, a vehicle for removing an accumulation of particles comprises, a vehicle body, a system configured to remove the particles in bulk, and an arm coupled to and extending from the vehicle body. The arm comprises a first sweeping element and a second sweeping element. The first sweeping element includes a first shaft member rotatable about a first longitudinal axis, and a first set of bristles projecting away from the first axis along the first shaft member. The second sweeping element includes a second shaft member rotatable about a second longitudinal axis, and a second set of bristles projecting away from the second axis along the second shaft member. The first and second longitudinal axes are a distance apart.

In accordance with another aspect of the invention, the sweeping elements define a concerted sweeping area.

In accordance with still another aspect of the invention, the shaft members rotate in proximity to the ground with the first and second longitudinal axes being substantially vertical.

In accordance with yet another aspect of the invention, the first and second sweeping elements include bristles projecting away in a substantially radial manner.

In accordance with yet another aspect of the invention, the first and second sweeping elements include bristles projecting away in a substantially non-radial manner.

In accordance with yet another aspect of the invention, the arm includes a device for adjusting the distance between the sweeping elements.

In accordance with yet another aspect of the invention, the arm includes a device for adjusting a reach of the arm so as to extend and retract the sweeping elements with respect to the vehicle body.

In accordance with yet another aspect of the invention, the system is a snow blower, a plow or a sweeper.

In accordance with yet another aspect of the invention, the system comprises a snow blower and a spout at a front of the vehicle.

In accordance with yet another aspect of the invention, the sweeping elements are located to the rear of the snow blower when the arm is retracted.

In accordance with yet another aspect of the invention, the arm is movably coupled so as to move the sweeping elements around the vehicle body.

In accordance with yet another aspect of the invention, the arm can rotate about a horizontal axis so as to be movable to either side of the vehicle.

In accordance with yet another aspect of the invention, the arm comprises a beam having adjustable length, the sweeping elements are coupled to longitudinal ends of the beam, and a mid portion of the beam is pivotally coupled the arm so that the sweeping elements can point to any direction within a substantially vertical plane.

In accordance with yet another aspect of the invention, the arm comprises a forearm that is pivotally coupled to the arm and is rotatable about an axis perpendicular to the horizontal axis so that the forearm can bring the beam to a substantially transverse or longitudinal position about the vehicle.

In accordance with yet another aspect of the invention, the sweeping elements have variable rotational speeds.

In accordance with yet another aspect of the invention, the vehicle is a tracked vehicle.

In accordance with yet another aspect of the invention, at least a movement of the arm is powered hydraulically.

In accordance with yet another aspect of the invention, a vehicle for removing an accumulation of particles comprises a vehicle body, and an arm coupled to and extending from the vehicle body. The arm comprises a sweeping element including a shaft member rotatable about a longitudinal axis. The sweeping element includes a set of bristles projecting away from the axis along the shaft member. When the sweeping element rotates in proximity to the ground, the longitudinal axis is substantially vertical.

In accordance with yet another aspect of the invention, the set of bristles comprises a first portion of bristles projecting away in a substantially radial manner and a second portion of bristles projecting away in a substantially non-radial manner.

In accordance with yet another aspect of the invention, the arm is movably coupled so as to move the sweeping element around the vehicle body.

In accordance with yet another aspect of the invention, a vehicle for removing an accumulation of particles comprises a vehicle body and an arm movably coupled to and extending from the vehicle body. The arm comprises a sweeping element rotatable about a longitudinal axis. The sweeping element includes a set of bristles projecting away from the axis, and the arm is configured to move the sweeping element around the vehicle body by rotating the arm about a horizontal axis.

In accordance with yet another aspect of the invention, the arm includes a device for adjusting a reach of the arm so as to extend and retract the sweeping element with respect to the vehicle body.

In accordance with yet another aspect of the invention, the sweeping element is pivotally coupled to the arm so that the sweeping element can point to any direction within a substantially vertical plane.

In accordance with yet another aspect of the invention, a vehicle for removing an accumulation of particles comprises a vehicle body and an arm coupled to and extending from the vehicle body. The arm comprises a sweeping element rotatable about a longitudinal axis. The sweeping element includes a set of bristles projecting away from the axis. The vehicle includes a computer system for tracking the location of an object from which the particles are removed.

In accordance with yet another aspect of the invention, the computer system includes a global positioning system.

In accordance with yet another aspect of the invention, the computer system includes a first element for detecting a radio frequency identification tag on the object.

In accordance with yet another aspect of the invention, the computer system includes a second element for moving the vehicle and the sweeping elements in response to the radio frequency identification tag on the object.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 6 is a perspective view of the removal system showing another arrangement with the forearm folded in.

FIG. 8 is a perspective view of the removal system showing yet another arrangement with the arm and the beam retracted and the forearm folded in.

DETAILED DESCRIPTION OF THE INVENTION

Figure 1:
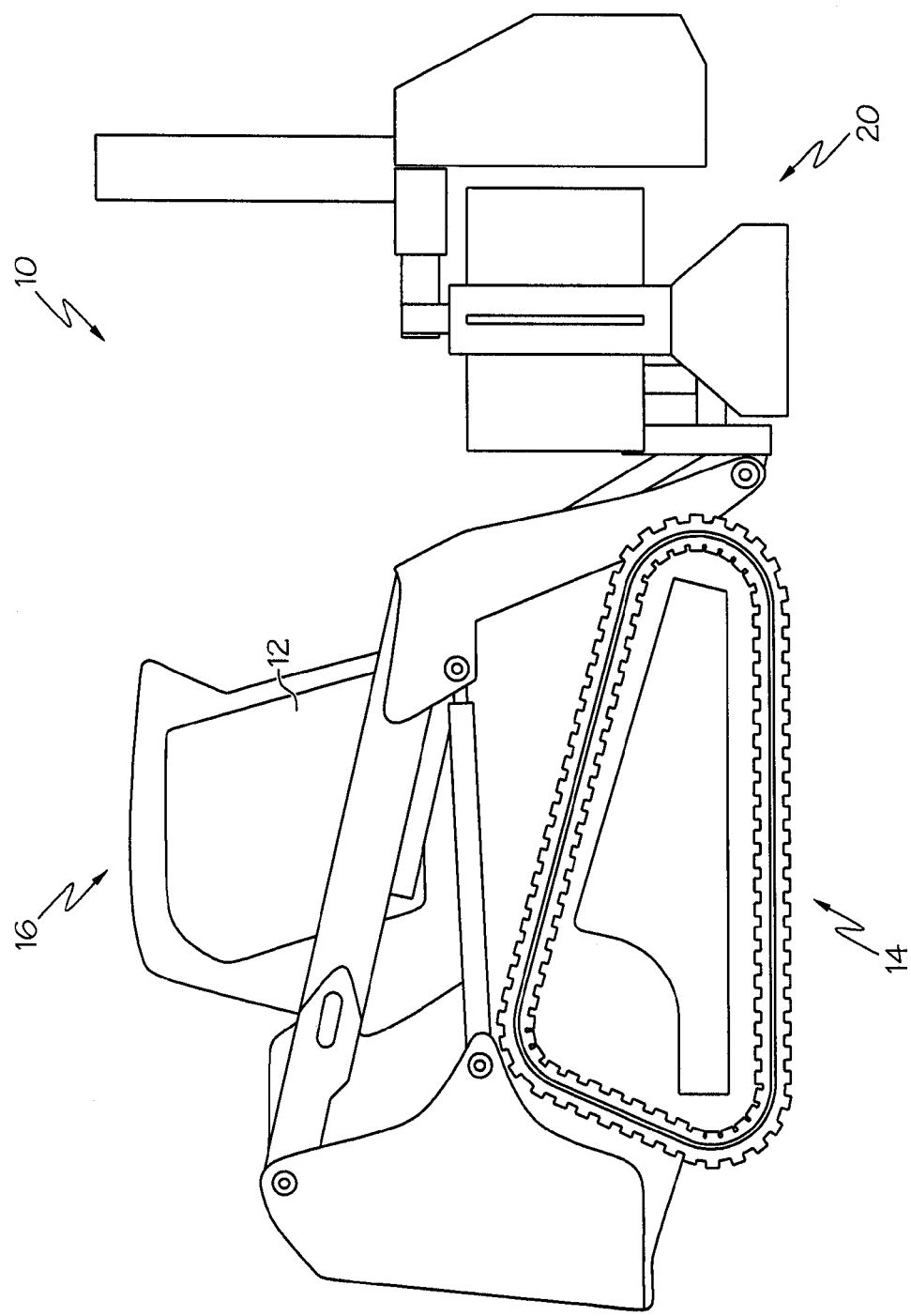
FIG. 1 is a side schematic view of a vehicle implementing an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices.

FIG. 1 illustrates an example of a vehicle 10 on which a system according to an aspect of the present invention can be implemented. The vehicle 10 may be of any type that a person of ordinary skill in the art can modify to implement the invention. As such, the vehicle 10 may be a loader, a bulldozer, a truck, a tractor, a sports utility vehicle, or any other vehicle for transporting the present invention and may have an operator compartment 12. The vehicle 10 may be operated by a steering wheel or other types of controls and may also be human-powered via handles similar to a walk-behind snow blower. The vehicle 10 can travel by wheels or tracks 14, as shown in FIG. 1. The advantage of a tracked vehicle is that the weight of the vehicle is more evenly distributed when traveling a surface such as a runway compared to a wheeled vehicle whose weight is focused on the contacting points of the wheels and can cause damage to the surface.

FIG. 1 also shows a removal system 20 in schematic form. The removal system 20 is used to remove an accumulation of particles such as snow. In the present embodiment, the removal system 20 is located in front of a vehicle body 16 of the vehicle 10. However, the system 20 can also be installed at the rear of, to the side of, above or even below the vehicle body 16. Additionally, a vehicle that can alter the location of the system 20 about the vehicle body 16 is also contemplated.

Figure 2:
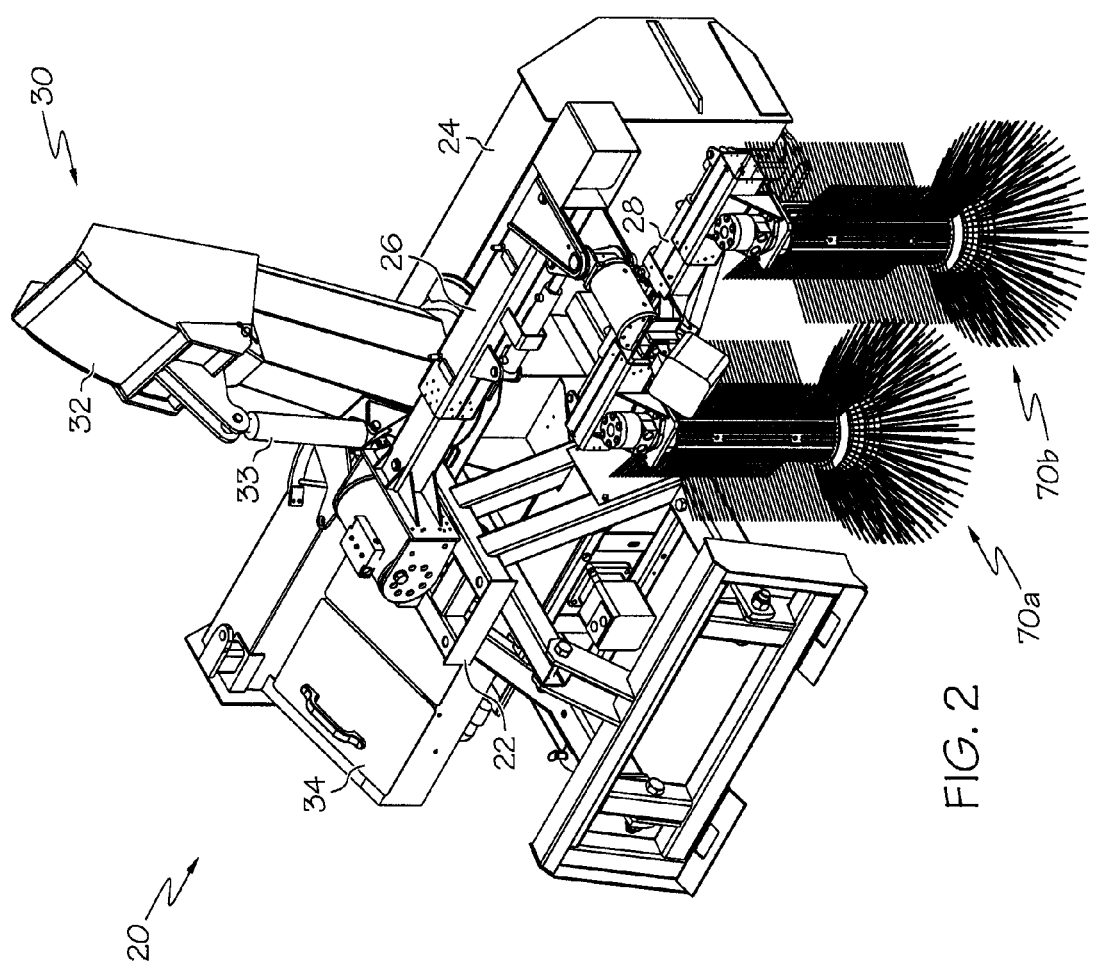
FIG. 2 is a rear perspective view of a removal system of an aspect of the present invention detached from the vehicle.
Figure 3:
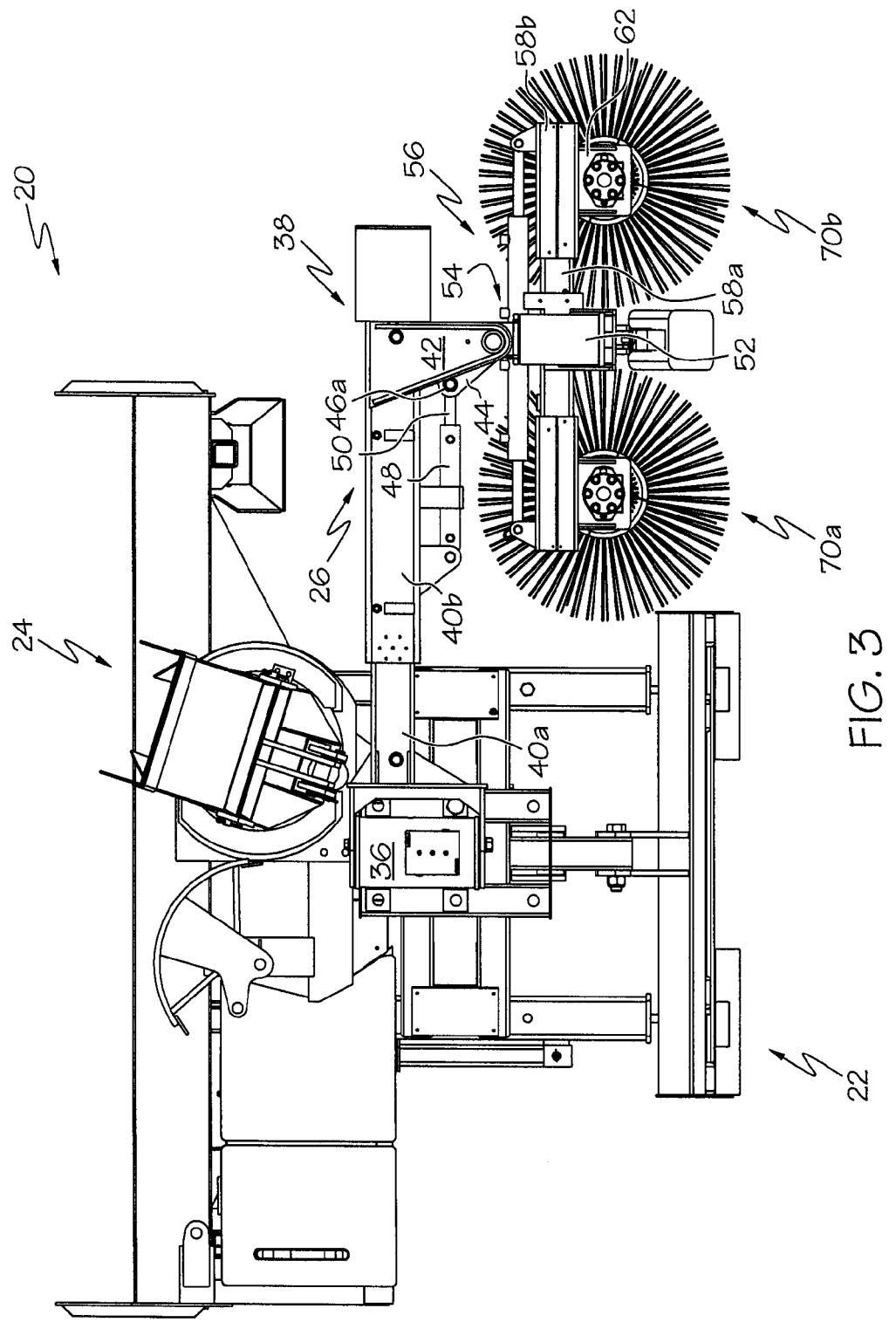
FIG. 3 is a top view of the removal system.

FIGS. 2 and 3 show an embodiment of the removal system 20 detached from the front of the vehicle body 16. In this embodiment, the system 20 mainly comprises a support structure 22, a snow blower 24, an arm 26, a beam 56, a first sweeping element 70a and a second sweeping element 70b as shown in FIG. 2.

The support structure 22 may be a linkage of rigid members configured to attach the system 20 to the vehicle 10 and to provide support for the components of the system 20. The support structure 22 may be configured, as in FIG. 2, to fix the system 20 to the vehicle body 16 or may be configured to attach to the vehicle 10 so that the system 20 can moved relative to the vehicle body 16, as discussed above, for example, by coupling the structure 22 to loader arms. Accordingly, the support structure 22 may be considered as part of the vehicle body 16.

As shown in FIG. 2, the snow blower 24 may be of a conventional type that has motor-powered blades for taking a large accumulation of snow in and thrusting it out through a spout 30. The spout 30 is rotatable about a vertical axis and includes a top cover 32 that can be adjusted via a hydraulically-powered cylinder 33 for controlling the direction in which snow is thrust. The blower 24 includes a cabinet 34 for accessing its components in case of service. Another embodiment of the system may include a plow, a sweeper, or the like instead of the snow blower 24 that can remove the accumulation of particles in bulk.

Figure 4:
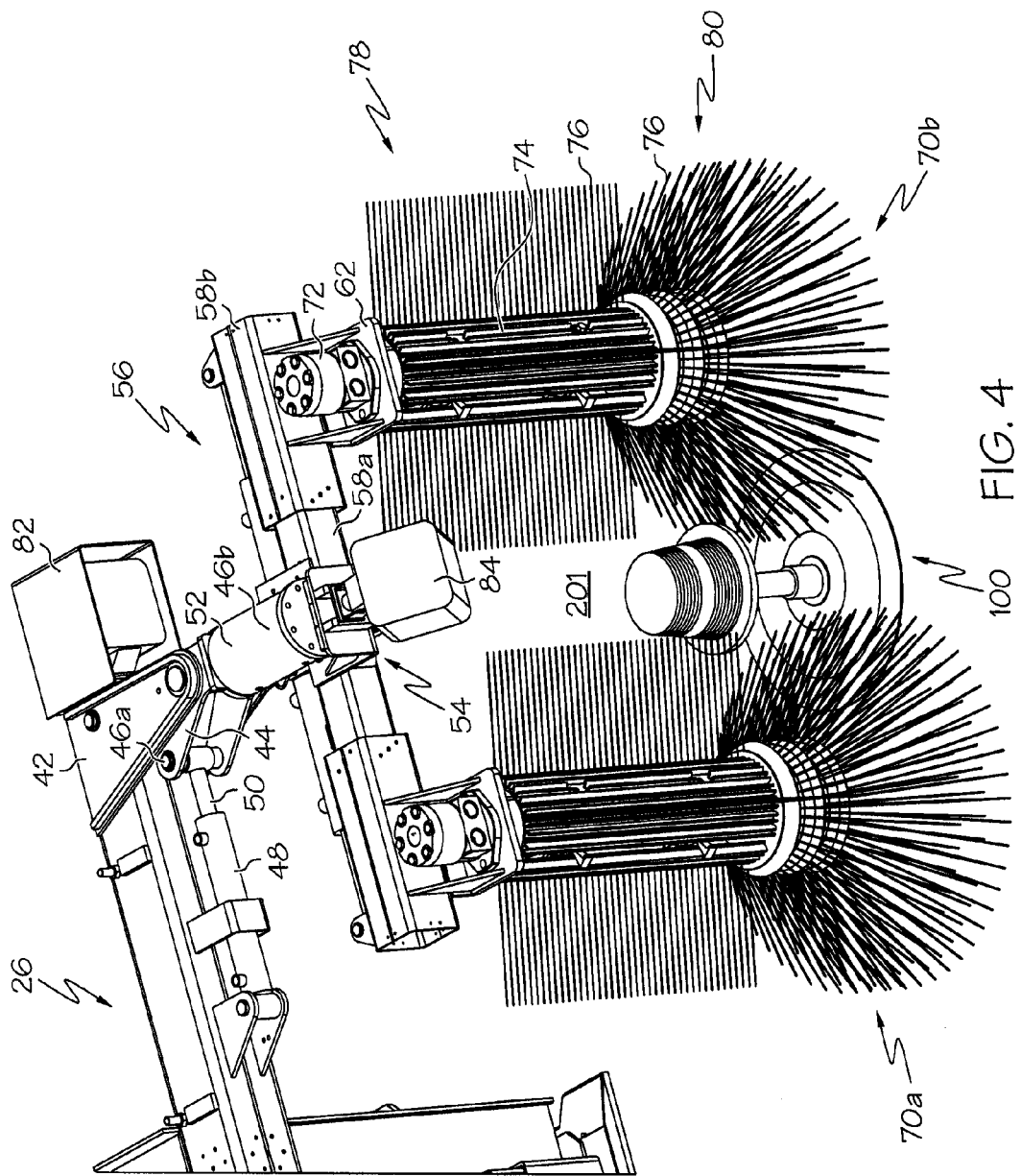
FIG. 4 is a close-up perspective view of sweeping elements of the removal system and an object from which particles are removed.
Figure 5:
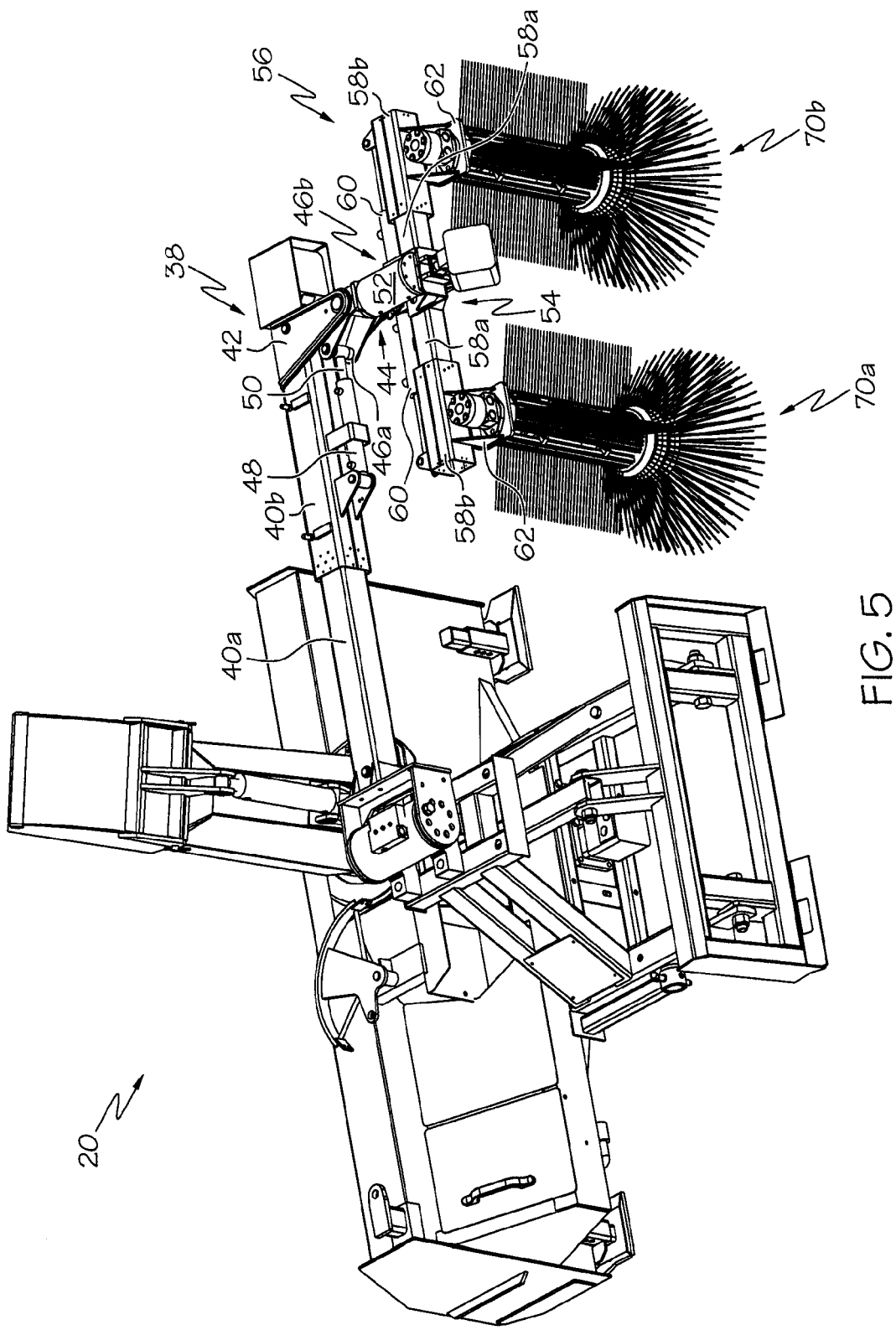
FIG. 5 is a perspective view of the removal system showing an arrangement of an arm, a forearm, a beam and the sweeping elements.
Figure 6:
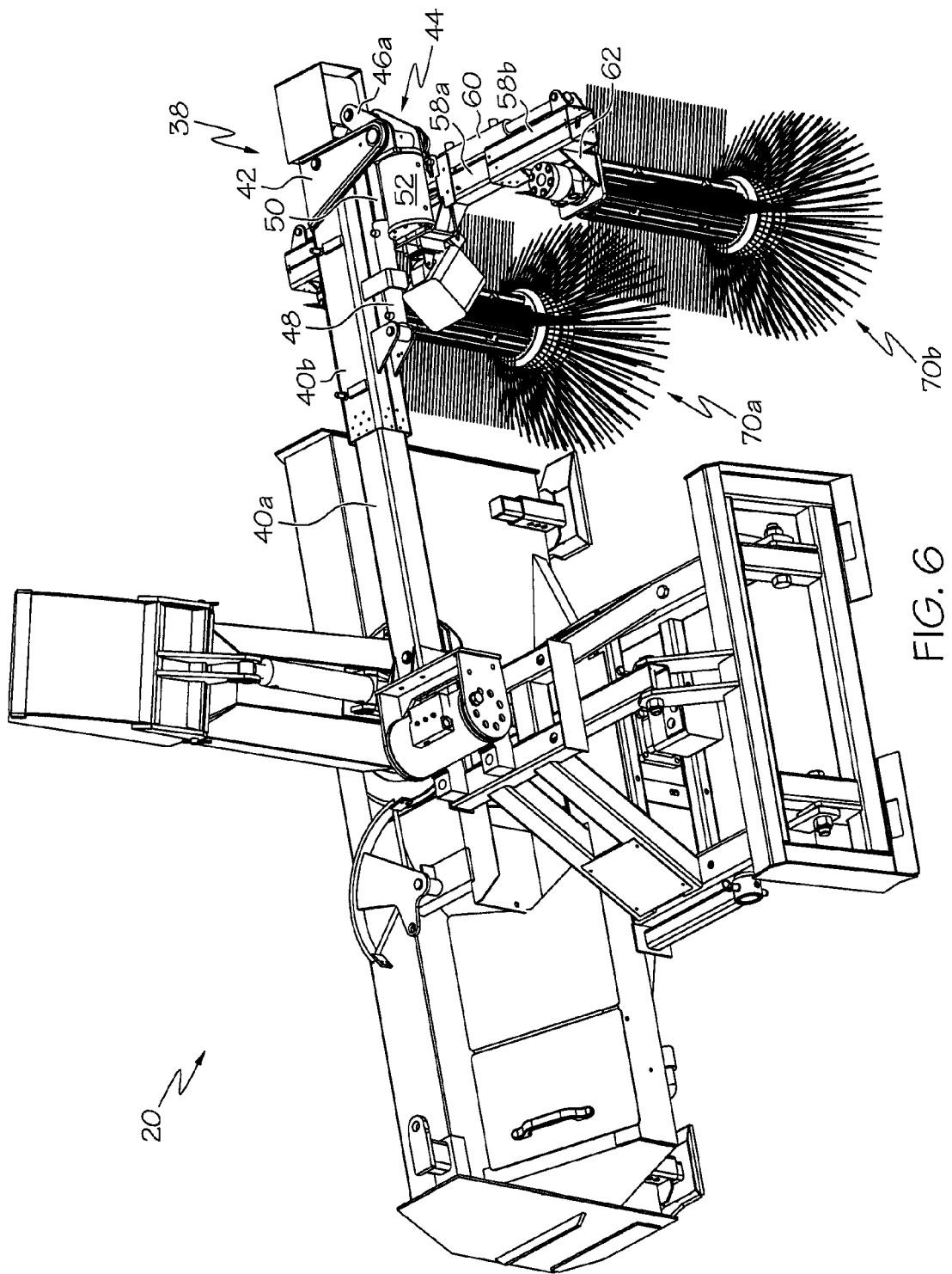

As shown in FIGS. 3-4, in the present embodiment, the arm 26 has a first end 36 and a second end 38. The first end 36 is rotatably coupled to the support structure 22 and extends from the support structure 22 so that the arm 26 may rotate about a horizontal axis within a substantially vertical plane able to swing from one side of the vehicle 10 to the other, as shown in FIGS. 9-12. Such rotational movement may be achieved by a motor at the first end 36. Other embodiments of the arm 26 may be configured to allow its rotation about a vertical axis at the first end 36. Moreover, the arm 26 is configured to have adjustable reach allowing it to retract or extend about the vehicle, as can be observed from FIGS. 5 and 7. This can be achieved through a hydraulic mechanism such as a cylinder located within telescopic members 40a, 40b that slide against one another based on the actuation of the cylinder. The second end 38 of the arm 26 includes a support 42 forming a joint and allowing a V-shaped forearm 44 to pivot about. The forearm 44 also has a first end 46a and a second end 46b. The pivoting of the forearm 44 may be achieved by a hydraulic cylinder 48 mounted on the arm 26 such that the forearm 44 will rotate in response to the movement of a piston rod 50 of the cylinder 48 coupled to the first end 46a of the forearm 44 (FIGS. 5-6). The second end 46b of the forearm 44 comprises a rotatable portion 52 to which a mid portion 54 of a beam 56 is coupled so that the beam 56 lies across the forearm 44 and the beam 56 and the rotatable portion 52 of the forearm 44 rotate as one. The rotatable portion 52 is mounted to the beam 56 so that the beam 56 and the arm 26 do not interfere with one another. In this embodiment, based on the pivoting movement of the forearm 44, the beam 56 will be oriented in a substantially transverse manner about the vehicle 10 when the piston rod 50 is retracted (FIG. 5) while the beam 56 will be oriented in a substantially longitudinal manner about the vehicle 10 when the piston rod 50 is extended (FIG. 6). The beam 56 is substantially symmetrical about the mid portion 54 and each half of the beam 56 comprises sliding members 58a, 58b and a cylinder 60 for controlling the movement of the sliding members 58a, 58b about one another, as contrastingly shown in FIGS. 5 and 7. As a result, the length of each half is adjustable and the halves can extend and retract about the mid portion 54 of the beam 56 to adjust the distance between the sweeping elements 70a, 70b. The sliding members 58b farthest from the mid portion 54 have bracket structures 62 for attaching the sweeping elements 70a, 70b.

Various mechanisms for extending or retracting the arm 26 and the beam 56 are also contemplated. Instead of the telescopic members 40a, 40b and sliding members 58a, 58b, extendable hoses with folds can house the cylinder, or bar linkages arranged in a scissor-like manner can also achieve the extension/retraction. The arm 26 and the beam 56 may instead alter their length using a screwing mechanism where a shaft is threaded and can be screwed in or out through motor-powered rotations.

As shown in FIG. 4, the sweeping elements 70a, 70b are broom-like structures for removing an accumulation of particles. Each of the sweeping elements 70a, 70b comprises a motor 72, a shaft member 74 and bristles 76. The motor 72 is mounted on the sliding member 58b through the bracket structure 62 and is configured to rotate the shaft member 74 about its longitudinal axis. The bristles 76 are attached to the shaft member 74 and are configured to project away from the shaft member 74 in a variety of ways. Actuation of the motor 72 rotates the bristles 76 about the longitudinal axis creating a sweeping effect in each sweeping element 70a, 70b. The bristles 76 can be made of natural or synthetic materials displaying one or more of the suitable characteristics such as durability, lightness or resiliency. For example, polymers, straw, fur, twig or the like may be used. In the present embodiment, the bristles 76 can be divided primarily into an upper portion 78 and a lower portion 80. In the upper portion 78, the bristles 76 project along the shaft member 74 in a substantially radial manner and are arranged in four circumferentially orthogonal sets about the longitudinal axis. In the lower portion 80, the bristles 76 project from a bottom of the shaft member 74 in a circumferentially scattered manner and at a non-radial, downward angle. In the present embodiment, as shown in FIG. 4, the lower portion 80 comprises three disc broom heads stacked on one another. The bristles 76 can be integral with the shaft member 74 or be detachable. For example, the shaft member 74 may be configured to include axially extending grooves for accepting elongate broom heads with bristles that can be slidingly inserted into the grooves. The broom head may instead be annular so that the broom heads can be stacked on top of another like the lower portion 80 of the shaft member 74. It is contemplated that, if detachable broom heads with bristles 76 are used, the broom heads may have various shapes and can be assembled onto the shaft member in a variety of ways.

The bristles 76 may be arranged on the broom head in various manners, for example, at various angles, in order to achieve varying effects. As such, the bristles 76 may be oriented at an upward angle, at a downward angle, vertically, or in a substantially radial manner, i.e., horizontally. The bristles 76 may accomplish such orientation prior to or during rotation. Moreover, the arrangement of the bristles 76 on the shaft member 74 need not be as clearly distinguishable as in the present embodiment where they are divided into the upper portion 78 and the lower portion 80. For example, the bristles 76 may simply be scattered about the outer surface of the shaft member 74 including the base and the shaft. Furthermore, the effectiveness of the sweeping mechanism may be varied by changing the type of bristles 76 used depending on the conditions of the accumulated particles such as when snow is in a hardened state.

Figure 9:
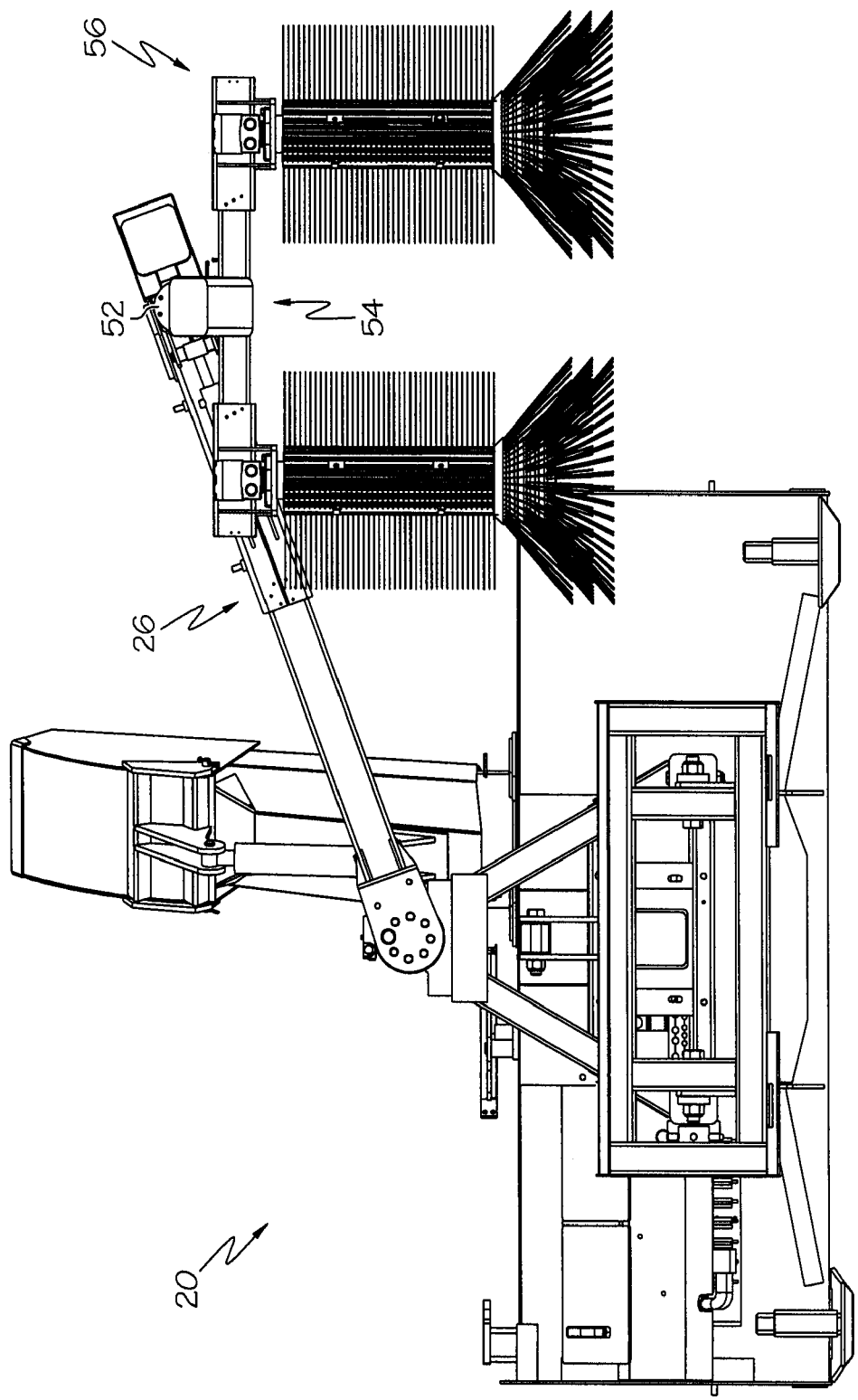
FIG. 9 is a rear view of the removal system showing yet another arrangement with the arm rotated counterclockwise.
Figure 10:
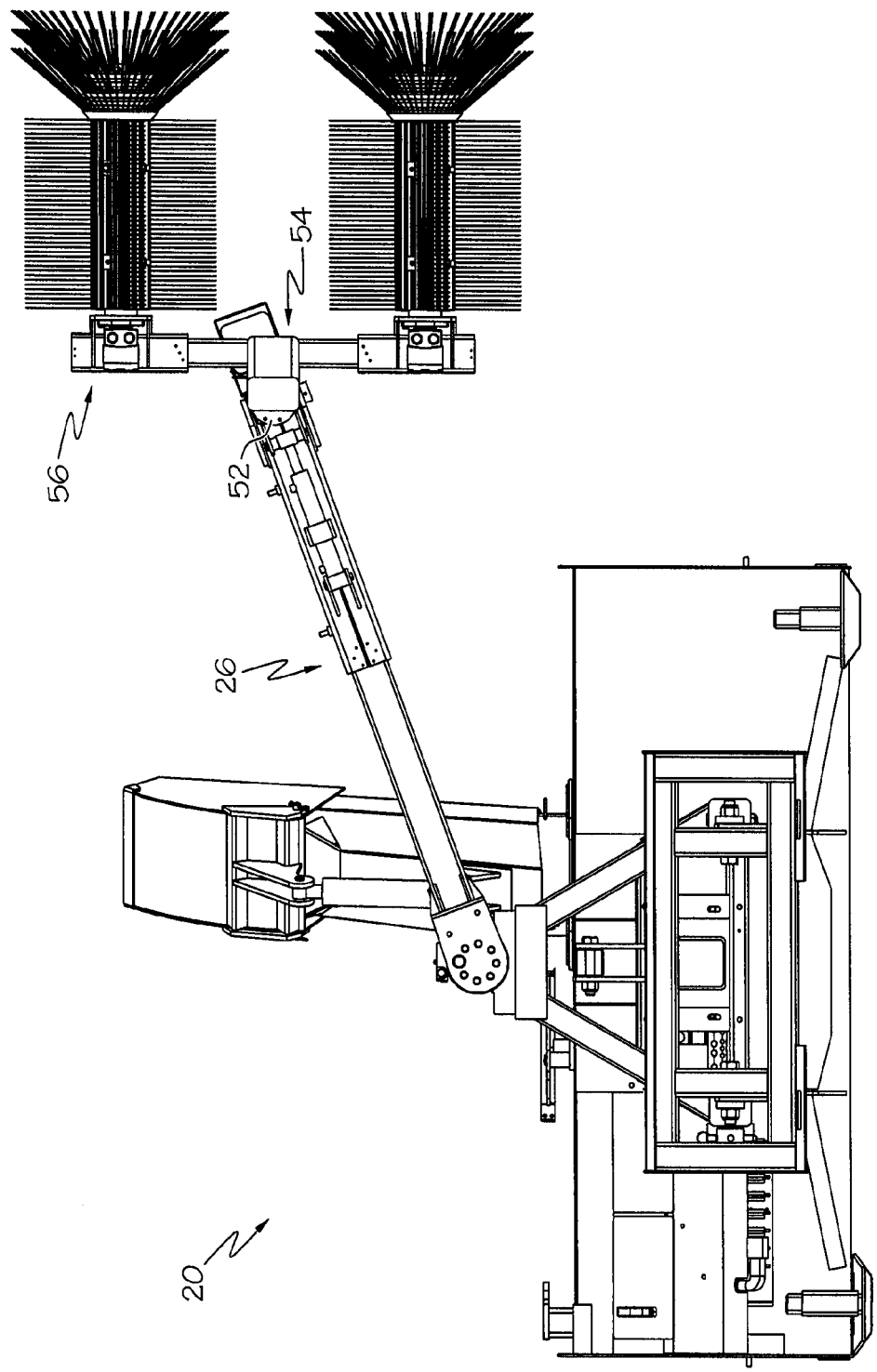
FIG. 10 is a rear view of the removal system showing yet another arrangement with the arm and the beam rotated counterclockwise.
Figure 11:
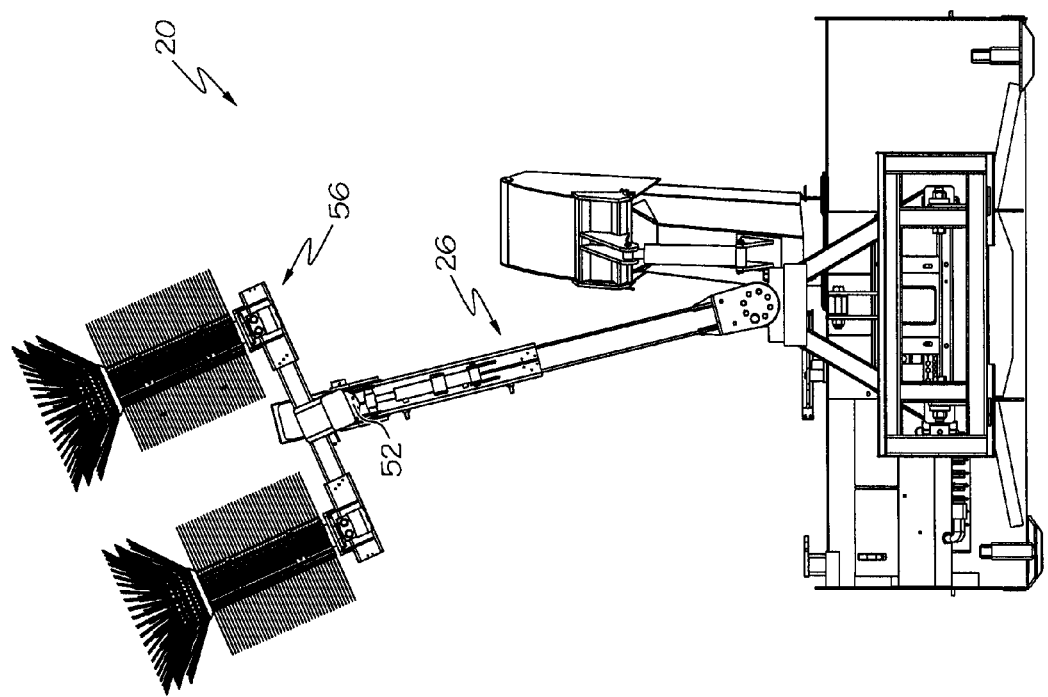
FIG. 11 is a rear view of the removal system showing yet another arrangement with the arm and the beam further rotated counterclockwise.

In this embodiment, the bristles 76 that extend along the shaft member 74 in the upper portion 78 projecting in a substantially radial manner remove the accumulated particles at elevated areas of an object 100 while the bristles 76 in the lower portion 80 of the shaft member 74 projecting in a substantially non-radial manner remove the accumulated particles at or near the ground, for example, at indicators that are flush or recessed with respect to the ground. The object 100 can have various shapes and heights. For example, the object can be relatively shorter like a light or a sign near a runway. However, as shown in FIGS. 9-11, the range of the arm 26 and the rotatable portion 52 allows accumulation on taller objects to be cleaned if necessary.

Figure 7:
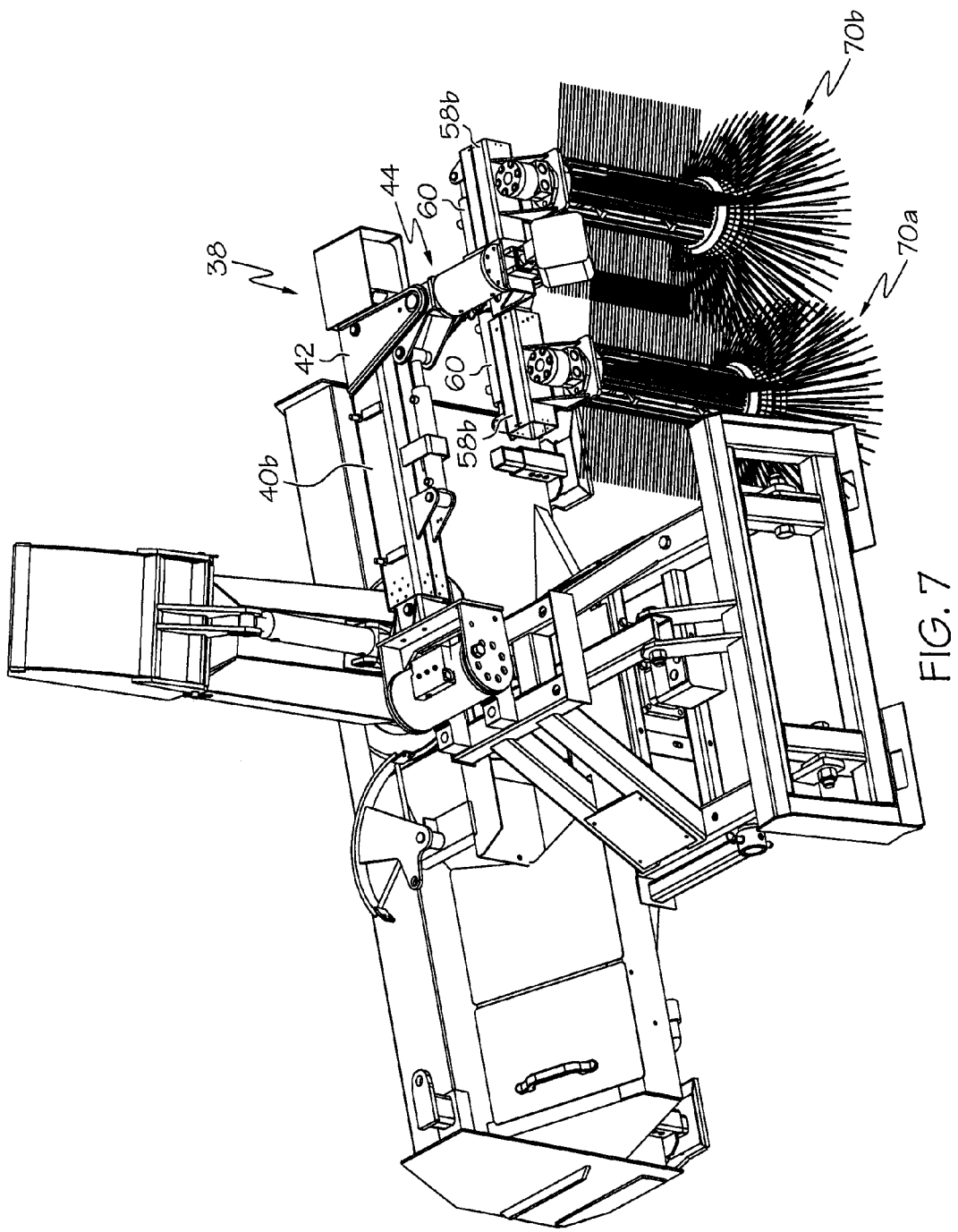
FIG. 7 is a perspective view of the removal system showing yet another arrangement with the arm and the beam retracted.
Figure 12:
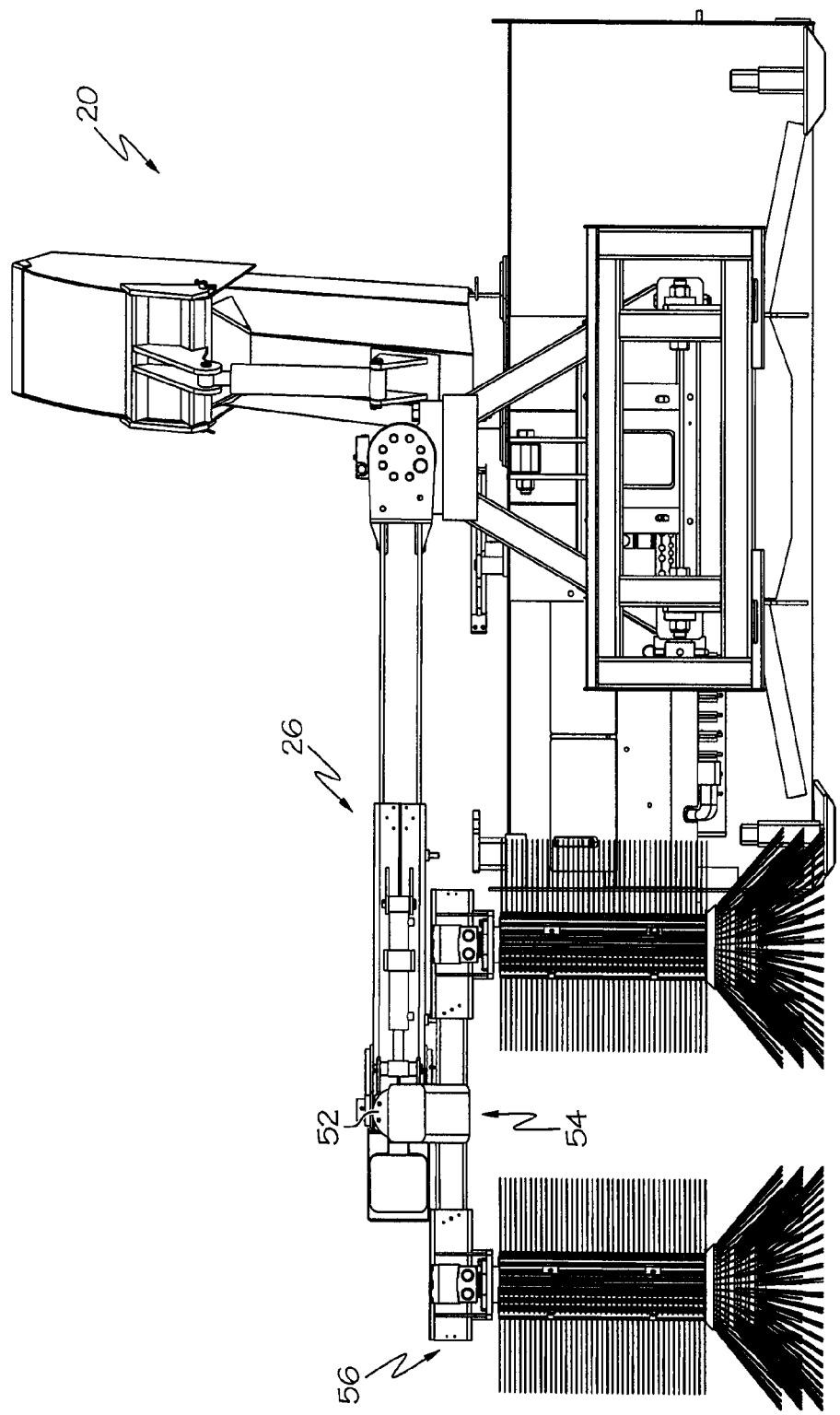
FIG. 12 is a rear view of the removal system showing yet another arrangement with the arm and the beam even further rotated to reach the left of the vehicle.

A person of ordinary skill in the art will appreciate that, based on the above, the arm 26 in the present embodiment can be moved to either side of the vehicle 10 (FIGS. 5 and 12) through rotation of at least 180 degrees or to the front or rear of the vehicle 10 if a method of moving the arm 26, such as rotation about a vertical axis, is additionally provided. The actuation of cylinder 48 can move the forearm 44 so that the beam 56 is substantially transverse (FIG. 5) or substantially parallel (FIG. 6) to the vehicle 10. The rotatable portion 52 allows the sweeping elements 70a, 70b to point to any direction within a substantially vertical plane. As such, the sweeping elements 70a and 70b can be rotated so that the longitudinal axes are substantially vertical and in proximity to the ground on either side of the vehicle 10 (FIGS. 5 and 12). The arm 26 can be extended or retracted about the vehicle 10 (FIGS. 5 and 7) and a distance between the sweeping elements 70a, 70b can also be adjusted (FIGS. 5 and 7). Moreover, the rotatable portion 52 can bring the sweeping elements 70a, 70b to a desired orientation as the arm 26 is rotated (FIGS. 9-12). The arm 26 and the beam 56 can each be maintained jointly, or independently, in a substantially non-horizontal manner such as when the shape or height of the object 100 makes such adjustment necessary (FIGS. 9-12). For example, it is possible for the arm 26 to be raised and maintained at an angle while beam 56 is maintained horizontally to remove accumulation from a taller object 100 (FIG. 9). Often, removal operations will take place while the sweeping elements 70a, 70b are in proximity of the ground and the longitudinal axis of each sweeping element 70a, 70b is substantially vertical (FIGS. 5 and 12). However, the sweeping elements 70a, 70b can be maintained in different orientations during removal operations such as if the shape or height of the object 100 makes it necessary.

In the present embodiment, the arm 26 comprises the two sweeping elements 70a, 70b located symmetrically about the mid portion 52 of the forearm 44 with the bristles 76 projecting away along the shaft member 74. An advantage of the bristles 76 located along the shaft member 74 is that the accumulation on the sides of an elevated object 100 may be cleaned whereas conventional bristle arrangements are not suitable for this purpose. The range of the arm 26 allows the sweeping elements 70a, 70b to reach even objects 100 with substantial elevation. Furthermore, both sides of an object 100 can be cleaned by passing it between the sweeping elements 70a, 70b as the vehicle 10 passes by the object 100 once through a concerted sweeping area 201 (FIG. 4). This aspect of the invention provides a time-efficient way to remove accumulated particles from an elevated object 100 because, if only one of the sweeping elements 70a, 70b were available, it would have to be moved around the object 100, or it may be necessary for the vehicle 10 to make another trip by the object 100. However, the present invention also contemplates variations of the arm 26 comprising only one sweeping element or more than two. For embodiments of the arm 26 with more than two sweeping elements, it would also be possible to arrange them in a non-linear, polygonal manner, such as in a triangle, rectangle, square, or circle, instead of the beam 56. Therefore, removal of accumulated particles will occur as long as at least one sweeping element is present and comes in contact with the object.

Moreover, the present invention also contemplates alternative embodiments of the removal system 20. For example, the removal system 20 may be without a blower 24, a plow, a sweeper, or other systems configured to remove the particles in bulk, and may simply be equipped with the arm 26 including the sweeping elements 70a, 70b. Also, the arm 26 may have a reduced or no range of movement. For example, the arm 26 may not extend or retract, or may not rotate to the other side of the vehicle 10. Also, the removal system 20 may comprise two arms on each side of the vehicle 10 that are rotatable about a vertical axis toward the front or rear of the vehicle 10. Another example of such an embodiment would be a vehicle 10 with an arm 26 extending to the front of the vehicle 10 so that an object 100 must be approached by directing the front of the vehicle 10 toward the object 100 instead of passing by the object 100 as done with the present embodiment. Moreover, the sweeping elements 70a, 70b may be directly mounted on the arm 26 without the forearm 44 or the beam 56 which contribute to various orientations of the sweeping elements 70a, 70b.

The sweeping elements 70a, 70b define the concerted sweeping area 201, shown in FIG. 4. The concerted sweeping area 201 can be defined as an area where the object 100 benefits from a sweeping effect of a plural number of sweeping elements 70a, 70b. With only one sweeping element, there would not be a concerted sweeping area. But, with at least two sweeping elements, at least one concerted sweeping area would be present and multiple concerted sweeping areas may have varying degrees of sweeping effect whereas sweeping areas other than a concerted sweeping area would only benefit from one sweeping element. For example, in a linear arrangement of three sweeping elements, there would be multiple concerted sweeping areas 201 with equal degree of sweeping effect, while if three sweeping elements are arranged in a triangle, there would be multiple concerted sweeping areas 201 with the sweeping effect being highest at the center of the triangle.

Figure 8:
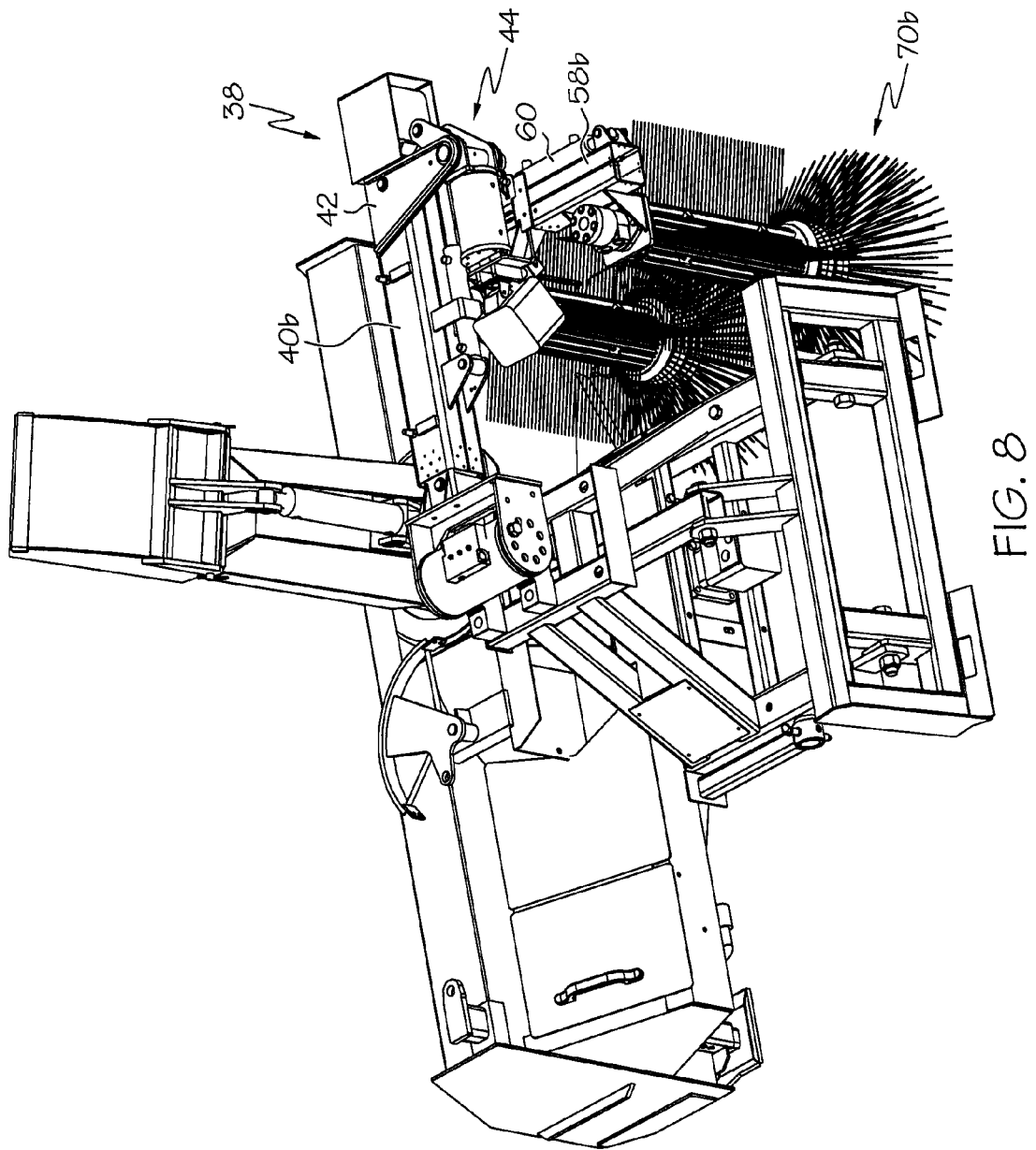

In the present embodiment, during removal operations, an operator can use the vehicle 10 strictly as a blower 24 to remove the bulk of the accumulated particles on a runway, strictly as a device for removing the accumulation of particles from objects 100 indicating the runway, or simultaneously as both. In this embodiment, when the vehicle 10 is used strictly as a blower 24, the reach of the arm 26 is adjusted to a retracted position and the beam is adjusted to a substantially longitudinal position (FIG. 8) so that the sweeping elements 70a, 70b are located substantially or completely to the rear of the blower 24. An extended set of sweeping elements 70a, 70b may hinder the movement of the vehicle 10. Other ways of retracting the sweeping elements 70a, 70b are also contemplated for other embodiments with the sweeping elements 70a, 70b arranged differently about the vehicle body 16, such as by simply reducing the reach of the arm 26. When the removal system 20 of the vehicle 10 is used, the sweeping elements 70a, 70b are extended out to a side of the vehicle 10. If the piston 48 on the arm 26 is in a retracted state (FIG. 5), the accumulation on an object is removed as the vehicle 10 passes by the object 100 and at least one of the sweeping elements 70a, 70b come in contact with the accumulation. If a front profile of the object 100 is too wide to pass between the sweeping elements 70a, 70b but a side profile is sufficiently narrow, the operator may conduct the removal operations by bringing the piston 48 to an extended state and orienting the beam 56 in a substantially parallel manner about the vehicle 10 (FIG. 6). The operator could then remove the accumulation by approaching the object 100 laterally. A person of ordinary skill will appreciate that various embodiments result in variations in how they are operated while still coming under the scope of the present invention.

Rotation of the sweeping elements 70a, 70b may be configured so that the removed accumulation will be directed to the front of the blower 24 and be removed along with the bulk of the accumulation. Moreover, if the arm 26 is configured to allow more movement such as rotation about a vertical axis in addition to a horizontal axis, the sweeping elements 70a, 70b may be moved to the front or even to the rear of the vehicle 10 for removal operations. The ability to extend the arm 26 allows removal of the accumulation as the vehicle 10 passes by the object 100 without passing over the object 100. Without the ability to extend the arm 26, the vehicle would have to be adapted so that the vehicle 10 can clear the object 100. Furthermore, the operator compartment 12 may be configured to provide a clear view of the removal operations.

When the sweeping elements 70a, 70b are moved near an object 100, the mobility of the vehicle 10 is also an important factor in addition to the movement of the arm 26. As such, the vehicle 10 may be provided to have delicate maneuverability since the objects 100 may be easily damageable and must be approached carefully. Thus, the vehicle 10 may offer forward and rearward movement with a range of speeds and have a small or zero turn radius. Moreover, the motor 72 may be configured to provide various rotational speeds for the shaft members 74 including rotation at slow speeds in order to carefully remove accumulations and avoid damage to the object 100.

The system 20 may further include wiring that controls the electrical, hydraulic, hydrostatic or mechanical movements on the snow blower 24. As shown in FIG. 4, the present embodiment of the arm 26 may further include a first light 82 at the second end 38 of the arm 26 for illuminating objects 100 in the path of the sweeping elements 70a, 70b ahead of the vehicle 10. The arm 26 may further include a second light 84 at the mid portion 54 of the beam 56 for illuminating an object 100 in the vicinity of the sweeping elements 70a, 70b.

Figure 13:
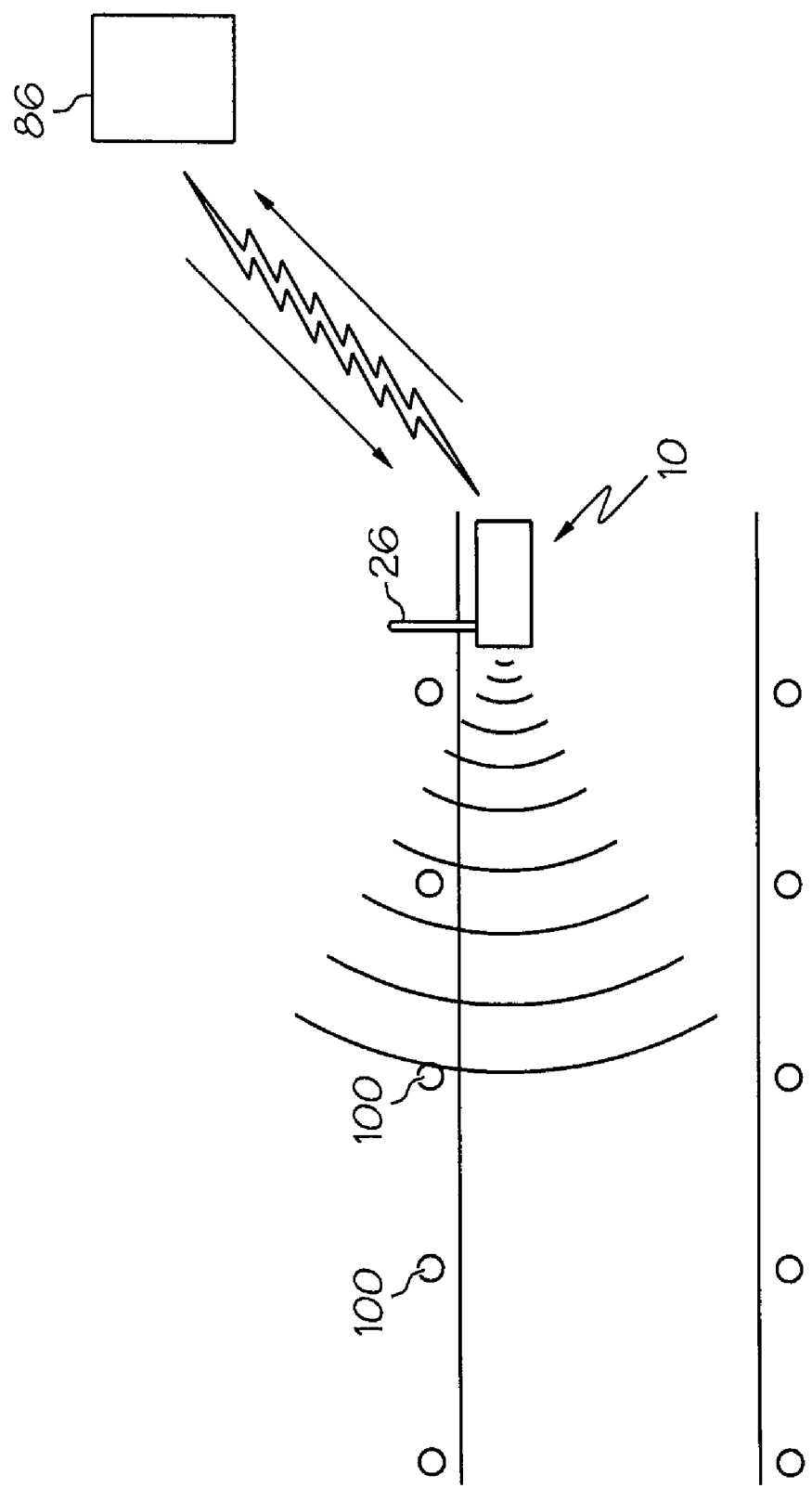
FIG. 13 is a schematic view of the vehicle implemented with a computer system tracking a location of the object.

Moreover, the operator compartment 12 of the vehicle 10 may be equipped with a computer system for monitoring the location of the object 100. As such, the operator compartment 12 may have a display to show the location of the vehicle 10 and the locations of the objects 100. As shown in FIG. 13, the computer system may include a global positioning system that communicates with an external source 86 for tracking the movement of the vehicle 10 and may further be configured to store the locations of the objects 100. The locations of the objects 100 may be input into the computer system using various methods such as manually inputting a set of coordinates corresponding to each location or storing the locations in the computer system as the vehicle 10 passes by each object 100 the first time. Furthermore, the locations of the objects 100 can also be detected using radio frequency identification (RFID) tags, which store data information and include a miniature antenna. In such cases, the vehicle 10 may comprise a device, such as a reader unit comprising an antenna and a radio transmitter, for locating the object 100 based on the transmission of a radio frequency signal and the response from the RFID tag. A variation of the vehicle 10 can further be equipped with a device allowing the vehicle 10 and the removal system 20 to automatically position themselves relative to the object 100 in response to the RFID tag and conduct the removal operations without any input from the operator.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The claimed invention is:

1. A vehicle for removing an accumulation of particles comprising:
    a vehicle body;
    a system configured to remove the particles in bulk; and
    an arm coupled to and extending from the vehicle body and comprising:
        a first sweeping element including a first shaft member rotatable about a first longitudinal axis, and including a first set of bristles projecting away from the first axis along the first shaft member, and
        a second sweeping element including a second shaft member rotatable about a second longitudinal axis, and including a second set of bristles projecting away from the second axis along the second shaft member, the first and second longitudinal axes being a distance apart,
    wherein the shaft members rotate in proximity to the ground with the first and second longitudinal axes being substantially vertical.

2. The vehicle of claim 1, wherein the first and second sweeping elements include bristles projecting away in a substantially radial manner.

3. The vehicle of claim 1, wherein the first and second sweeping elements include bristles projecting away in a substantially non-radial manner.

4. The vehicle of claim 1, wherein the arm includes a device for adjusting the distance between the sweeping elements.

5. The vehicle of claim 1, wherein the arm includes a device for adjusting a reach of the arm so as to extend and retract the sweeping elements with respect to the vehicle body.

6. The vehicle of claim 1, wherein the system is a snow blower, a plow or a sweeper.

7. The vehicle of claim 6, wherein the system comprises a snow blower and a spout at a front of the vehicle.

8. The vehicle of claim 7, wherein the sweeping elements are located to the rear of the snow blower when the arm is retracted.

9. The vehicle of claim 1, wherein the arm is movably coupled so as to move the sweeping elements around the vehicle body.

10. The vehicle of claim 9, wherein the arm can rotate about a horizontal axis so as to be movable to either side of the vehicle.

11. The vehicle of claim 10, wherein the arm comprises a beam having adjustable length, the sweeping elements are coupled to longitudinal ends of the beam, and a mid portion of the beam is pivotally coupled to the arm so that the sweeping elements can point to any direction within a substantially vertical plane.

12. The vehicle of claim 11, wherein the arm comprises a forearm that is pivotally coupled to the arm and is rotatable about an axis perpendicular to the horizontal axis so that the forearm can bring the beam to a substantially transverse or longitudinal position about the vehicle.

13. The vehicle of claim 1, wherein the sweeping elements have variable rotational speeds.

14. The vehicle of claim 1, wherein the vehicle is a tracked vehicle.

15. The vehicle of claim 1, wherein at least a movement of the arm is powered hydraulically.

16. A vehicle for removing an accumulation of particles comprising:
    a vehicle body;
    a system configured to remove the particles in bulk; and
    an arm coupled to and extending from the vehicle body and comprising:
        a first sweeping element including a first shaft member rotatable about a first longitudinal axis, and including a first set of bristles projecting away from the first axis along the first shaft member, and
        a second sweeping element including a second shaft member rotatable about a second longitudinal axis, and including a second set of bristles projecting away from the second axis along the second shaft member, the first and second longitudinal axes being a distance apart,
    wherein the arm is movably coupled so as to move the sweeping elements around the vehicle body, and
    wherein the arm can rotate about a horizontal axis so as to be movable to either side of the vehicle.

17. The vehicle of claim 16, wherein the arm comprises a beam having adjustable length, the sweeping elements are coupled to longitudinal ends of the beam, and a mid portion of the beam is pivotally coupled to the arm so that the sweeping elements can point to any direction within a substantially vertical plane.

18. The vehicle of claim 17, wherein the arm comprises a forearm that is pivotally coupled to the arm and is rotatable about an axis perpendicular to the horizontal axis so that the forearm can bring the beam to a substantially transverse or longitudinal position about the vehicle.

* * * * *